Figure 1:
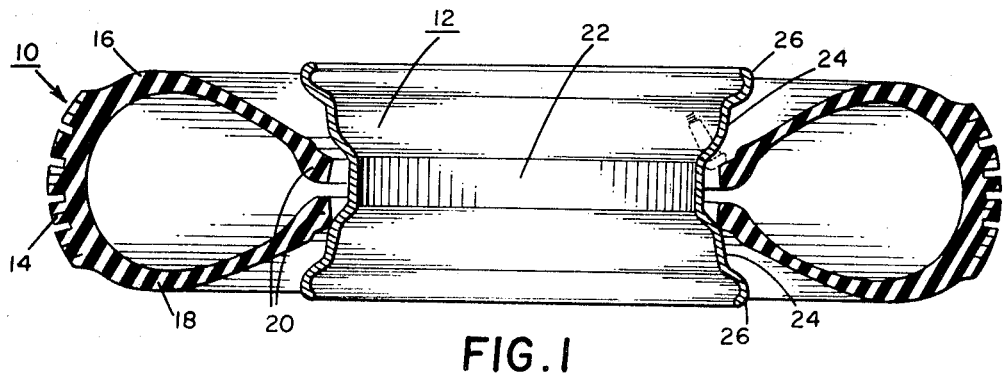

United States Patent
Kaminskas et al.

[15] 3,658,109
[45] Apr. 25, 1972

[54] DEVICE FOR MOUNTING AND INFLATING TUBELESS TIRES

[72] Inventors: Anthony F. Kaminskas, Lyndhurst; Steven O. Luzsicza, Huron, both of Ohio

[73] Assignee: Clevite Corporation

[22] Filed: Jan. 23, 1970

[21] Appl. No.: 5,208

[52] U.S. Cl. ........................................................... 157/1.1
[51] Int. Cl. ...................................................... B60c 25/12
[58] Field of Search .............................................. 157/1.1

[56] References Cited

UNITED STATES PATENTS

| | | | |
|---|---|---|---|
| 2,874,759 | 2/1959 | Ranallo | 157/1.1 |
| 3,081,816 | 3/1963 | Branick | 157/1.1 |
| 3,552,469 | 1/1971 | Corless | 157/1.1 |

*Primary Examiner*—Granville Y. Custer, Jr.
*Attorney*—Edward E. Sachs

[57] ABSTRACT

A device for mounting and inflating a tubeless tire on an automotive wheel rim. An annular member having an out-of-round cross-sectional configuration and an integral seating collar is placed between the flanged rim of the wheel and the sidewall of the tire to establish a sealed air chamber. The annular member includes a circular surface for rolling engagement with the sidewall and optionally a lip seal for engaging the sidewall.

1 Claim, 8 Drawing Figures

PATENTED APR 25 1972 3,658,109

INVENTORS
ANTHONY F. KAMINSKAS
STEVEN O. LUZSICZA
BY
Edward E. Sachs
ATTORNEY

DEVICE FOR MOUNTING AND INFLATING TUBELESS TIRES

The present invention relates generally to an automotive tire installation device and, more particularly, to an improvement for mounting and inflating a tubeless tire on a wheel rim.

In the prior art numerous devices have been known for aiding in the installation of tires on wheel rims. Such assistance is necessary as the sidewalls of the tire are usually collapsed and a seal cannot be readily established between the rim flange and the tire bead seat to permit air pressure to inflate the tire. In the past, an inflating device has already been successfully utilized. This device is secured on the circumference of the tire tread, usually proximate to the center thereof. The device comprises a tube which is inflated to constrict and reduce the diameter of the tire tread portion to cause a lateral movement of the sidewalls for pressing the tire bead tightly against the flanged portions of the rim. It has been found that these and similar devices cannot be readily utilized for mounting radial ply and belted tubeless tires. Numerous attempts have been made to overcome this difficulty and most of these attempts have failed for either economical or operational reasons.

In many of such new designs, rigid (metal) sleeves of a tubular nature are utilized. One end of the sleeve is placed tightly around the rim, while the other end extends axially outward. The rim engaging end bears against the sidewall of the tire in order to create a sealed area between the rim diameter and the sidewall. Such devices have exhibited, as already noted above, many shortcomings, for instance, in that they are unable to readily establish a seal-tight chamber and, when handled rather roughly by the installer, can be injurious to the latter.

It is therefore the primary object of this invention to provide an improved tire mounting and inflating device which obviates the disadvantages of the prior art and which provides an economical means for installing a radial ply tubeless tire in a safe and efficient manner.

One aspect of the present invention resides in the provision of a device for mounting and inflating a tubeless tire on a tire wheel rim in which the wheel rim is provided with a continuous flange at its axial periphery. The device comprises an annular member of elastomeric or rubber-like material for placement between the rim and the sidewall of the tire when the latter is mounted on the wheel. The annular member has an inner diameter substantially approximating the diameter of the flanged portion of the rim and a substantially continuous out-of-round cross-section. The annular member includes a collar projecting radially from the circumference to provide a seating surface for engagement with the rim flange; the arrangement of the annular member, located generally diametrically opposite to the rim seating surface, is adapted to maintain sealing contact engagement with the sidewall of the tire. This construction permits the tire to be inflated by frictionally seating the annular member between the sidewall of the tire and the wheel rim and establishing a sealed air chamber therebetween; further inflating of the tire is thus facilitated until the annular member automatically rolls off from and between the rim and the sidewall.

For a better understanding of the present invention, together with other and further objects thereof, reference is had to the following description taken in connection with the accompanying drawings, and its scope will be pointed out in the appended claims.

Figure 6:
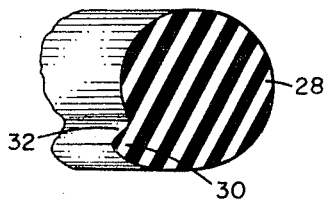
Figure 7:
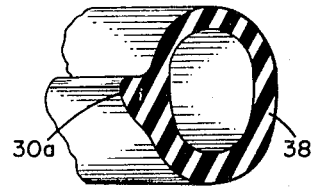
Figure 8:
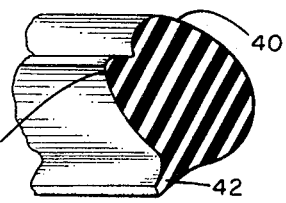

In the drawing;

FIG. 1 is a sectional view of a conventional uninflated tubeless tire mounted and supported on a rim;

FIGS. 2 to 5 are fragmentary views in section, similar to the view shown in FIG. 1, showing the present invention is various stages of assisting the mounting and inflating of the tire; and FIGS. 6 to 8 are cross-sectional views of the device in accordance with the present invention, with FIG. 6 being an enlargement of the tire inflating device shown in FIGS. 2 to 5, and FIGS. 7 to 8 representing modifications thereof.

Referring now to the drawing, there is shown in FIG. 1 a typical tubeless tire 10 mounted on a drop center wheel rim 12. The tire comprises a circumferentially arranged tread 14 with adjacent sidewalls 16, 18 having at their outer ends a tire bead portion 20. The wheel rim 12 is similarly of conventional configuration and includes a drop center well portion 22 and complementary tire bead portions 24 and a circumferentially continuous flange 26 at each axial end of the flange.

The tire 10 is mounted upon the wheel rim 12 in the conventional manner until the same is positioned with both sidewalls 16, 18 proximate to the drop center well portion 22 substantially as shown in FIG. 1. This is normally accomplished with the assistance of a hand tool, such as a bar, or the like.

In accordance with the present invention an annular member 28 of elastomeric material is placed between a sidewall, e.g., 16 or 18 and the flanged portion 26 of the wheel rim 12. The annular member 28 is of ring-like configuration and has an inner diameter substantially approximating the outside diameter of the rim flange 26, so that the member 28 can be snugly placed around the flange for tight bearing engagement. In order to facilitate proper seating between the flange rim and the annular member 28 there is provided a seating surface in the form of a collar 30 projecting from the circumference of the annular member and being adapted for abutting the flange 26. Due to the projection of the seating collar 30 the annular member 28 is substantially out-of-round in cross section. A majority of the circumference of the annular member, when viewed in cross section, as shown, for instance, in FIG. 6, is substantially circular to provide rolling contact engagement with the sidewall of the tire as shown, for instance, in FIG. 2 the seating collar 30 forms a projection having, generally, a radial periphery bounded by a surface extending substantially tangential from the outer surface of the annular member and intersecting with the substantially flat surface 32 which in effect constitutes an extension of an imaginary geometric chord having a length approximating substantially the diameter of the annular member 28. The circumferential area of the annular member located generally diametrically opposite to the seating surface 32, of the collar 30, is circular in contour and this area is adapted for the aforesaid rolling contact with the sidewall of the tire.

Figure 2:
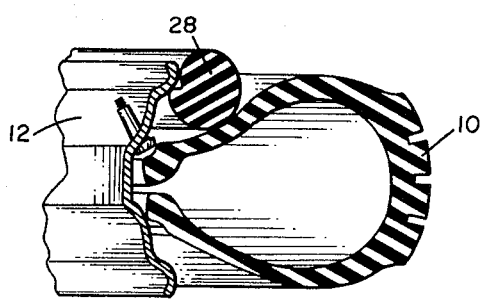

Referring now specifically to FIG. 2 there is shown the initial step after the annular member 28 has been frictionally seated between the sidewall and the rim for establishing a sealed air chamber therebetween.

Figure 3:
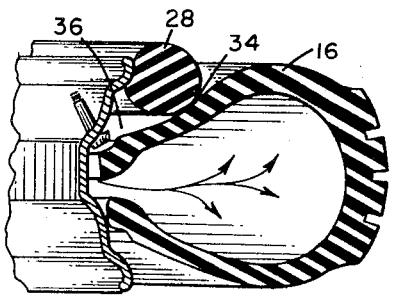

FIG. 3 illustrates a step, subsequent to the sequence shown in FIG. 2, in which the inflating of the tire has been started causing the annular member to roll on its rolling surface 34 while maintaining a tight and frictionally sealed contact between seating surface 32 and flange 26 whereby air is prevented from escaping the now sealed chamber 36. The sealed chamber 36 is established and maintained due to the pressure exerted upon the rolling contact surface 34 by the expanding sidewall 16.

Figure 4:
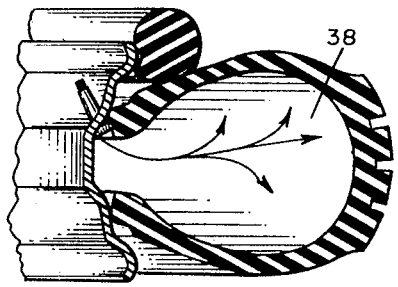
Figure 5:
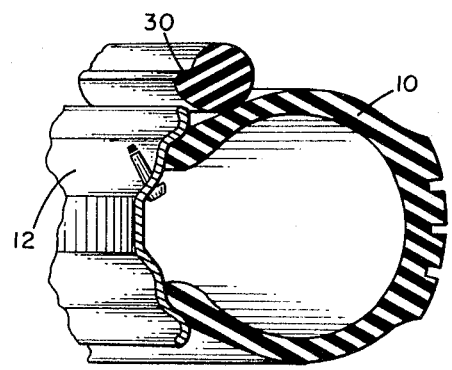

FIG. 4 illustrates that despite the fluid intercourse between chambers 36 and 38, the tire sidewalls expand due to increased internal air pressure whereby the rolling effect upon the annular member 28 is increased until the seating surface 32 comes into a position almost parallel to the plane of the flange whereupon the annular member 28 is caused to roll off the sidewall 16 and thereby being released from holding the engagement with the flange 26. At this point, the tire bead portion 20 comes to rest against the rim bead seat 24 and abuts the flange 26 of the rim 12 effecting a complete and satisfactory seating of the tire.

It will be appreciated by those skilled in the art that the basic concept of the present invention finds application in practically all instances where the installation of tubeless tires must be assisted. Inasmuch, however, as tubeless tire designs differ radically it may be desirable at times to provide a relatively softer annular member. This is readily accomplished by making the annular member 38 hollow as shown in FIG. 7.

Referring now to FIG. 8 the annular member 40 is provided with a pressure activated lip seal 42 which extends substantially radially from the circumference to the annular member and is adapted for seating engagement with the sidewall 16, 18 of the tire to further increase the integrity of the air chamber 36.

Each of the above described annular members 28, 38 and 40 can be readily molded, of rubber or rubber-like material in one piece so that collar 30, 30a and 30b, as well as lip seal 42, are integrally molded with and form an integral part of the respective annular member.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

We claim:
1. Device for mounting and inflating a tubeless tire on a tire wheel rim, in which the wheel rim is provided with a continuous flange at its axial periphery, comprising: an annular member of elastomeric material for placement between the rim and the sidewall of the tire when the latter is mounted on the wheel, said annular member having an inner diameter substantially approximating the diameter of the flanged portion of the rim and a generally circular cross section proportioned to effect rolling contact with the wheel flange, said cross section including a projection having a radial periphery bounded by a surface extending substantially tangential from the outer surface of the said annular member and intersecting with a substantially flat surface constituting an extension of a geometric chord having a length approximating substantially the diameter of the annular member; whereby upon inflating the tire the annular member is initially frictionally seated between said sidewall and said rim establishing a sealed air chamber therebetween and, upon further inflating of the tire, automatically rolls about said rim free from and between said rim and sidewall.

* * * * *